Jan. 13, 1970  J. R. PUENTE  3,489,265
FRAGILE PLATE CARRIER
Filed May 22, 1967
2 Sheets-Sheet 1
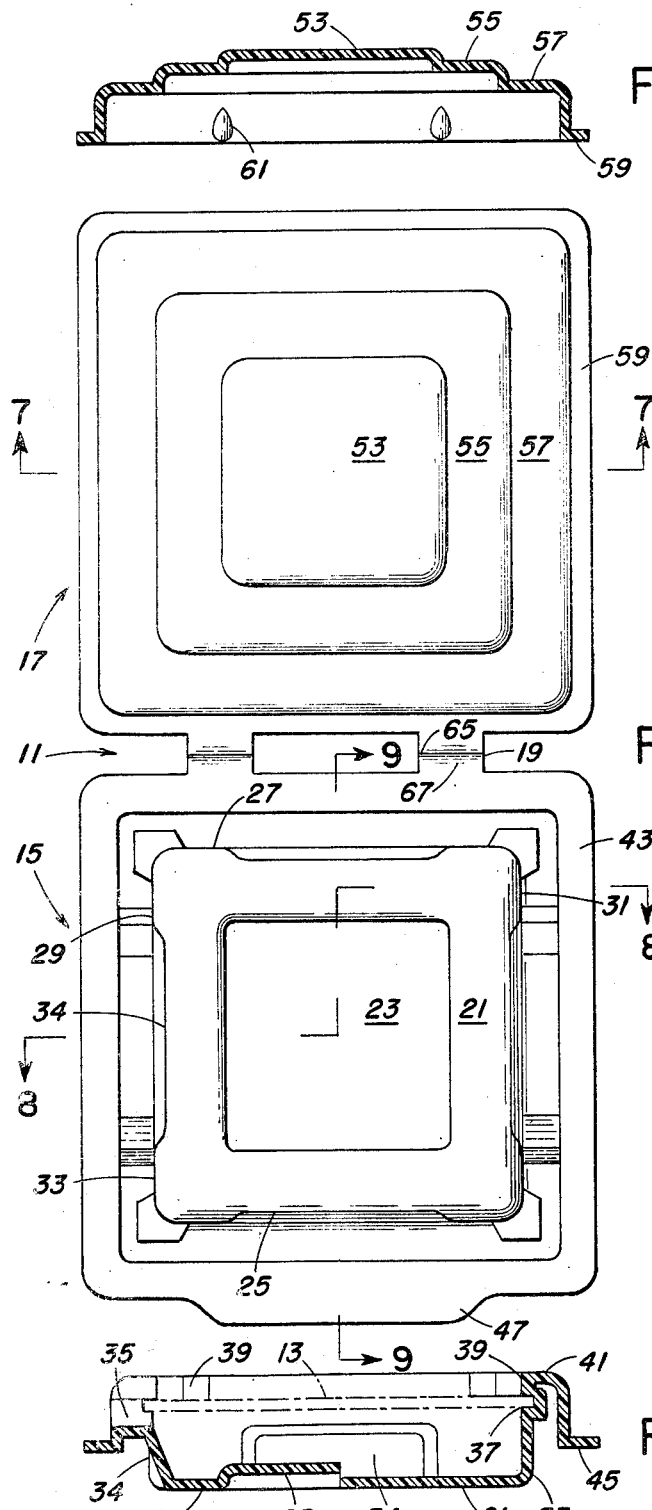
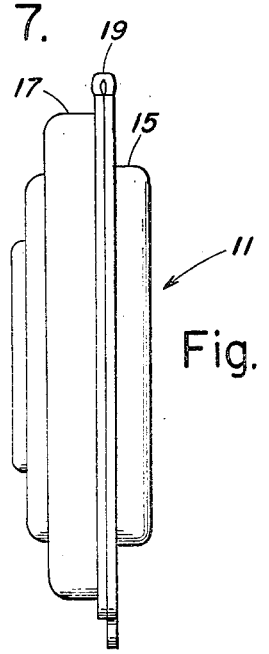
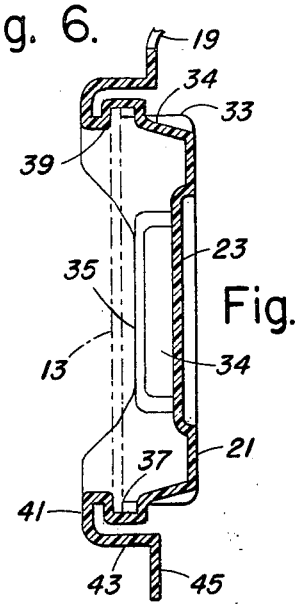

Jan. 13, 1970  J. R. PUENTE  3,489,265
FRAGILE PLATE CARRIER

Filed May 22, 1967  2 Sheets-Sheet 2

United States Patent Office 3,489,265
Patented Jan. 13, 1970

3,489,265
FRAGILE PLATE CARRIER
José R. Puente, Brighton, N.Y., assignor to Product Packaging Corporation, Rochester, N.Y., a corporation of New York
Filed May 22, 1967, Ser. No. 640,309
Int. Cl. A45c 11/00
U.S. Cl. 206—1                                                     10 Claims

ABSTRACT OF THE DISCLOSURE

Disclosed is a plastic carrier for a fragile glass plate or the like. The carrier is an integral structure comprising a plate holder member, a cover member and at least one strap-like hinge member integral with the first two members. The carrier, preferably vacuum formed from a flexible sheet of normally solid thermoplastic resin material, is shaped to give it rigidity in all three directions. When making the carrier from material selected from the group consisting of polyethylene, polyvinyl chloride and polystyrene, after it has been vacuum formed, but while each hinge member is still plastic or soft, each hinge member is longitudinally compressed and then flexed or folded, whereby, when the hinge member has hardened or set, the flexural strength of each hinge member is substantially increased over what it would be if this treatment had not occurred.

BACKGROUND OF THE INVENTION

There is a need for an inexpensive enclosed or covered carrier for a fragile, metal clad glass photographic plate, at least one side of which must be shielded under storage and transportation conditions from accidental contact with other surfaces, and which plate, therefore, can be held and handled only cornerwise and edgewise, while the carrier must positively hold the plate in position even when the carrier is open or uncovered.

An object of this invention is to provide such a carrier.

Another object of this invention is to provide such a carrier that can be made from inexpensive flexible plastic or synthetic resin sheeting.

Still another object of this invention is to provide such a carrier that is a unitary or integral structure.

Yet another object of this invention is to provide a generally improved and more satisfactory carrier for fragile glass plates and the like.

BRIEF DESCRIPTION OF THE DRAWINGS

These and other desirable objects are achieved by this invention which is described with reference to the drawings, which drawings are a material part of the disclosure. In the drawings:

FIG. 1 is a side view of a preferred specific embodiment of a fragile plate carrier of this invention, which view shows the specific embodiment in its closed or covered condition;

FIG. 6 is a bottom plan view of the open structure of FIG. 2, which view has been taken as indicated by the view plane 6—6 in FIG. 3;

FIG. 7 is a cross-sectional view of the cap member of the open structure of FIG. 2, which view has been taken as indicated by the sectioning plane 7—7 in FIGS. 2 and 6;

FIG. 8 is a cross-sectional view of the plate holder member, which view has been taken as indicated by the offset sectioning plane 8—8 in FIGS. 2 and 6; and FIG. 9 is a longitudinal sectional view of the plate holder member, which view has been taken as indicated by the sectioning plane 9—9 in FIGS. 2 and 6.

DESCRIPTION OF A PREFERRED EMBODIMENT

Figure 2:
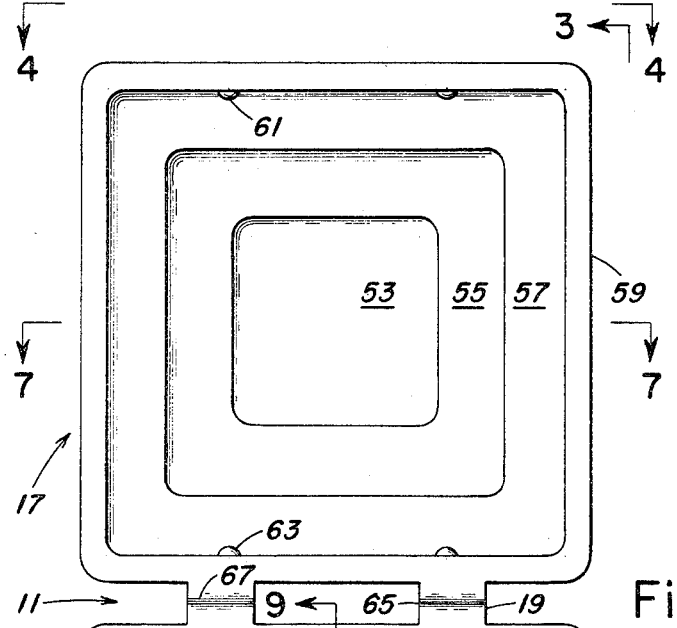
FIG. 2 is a plan view of the specific embodiment of FIG. 1, but with the plate holder member uncovered and the cap member swung back so that the view shows the insides of both the plate holder member and the cap member.
Figure 4:
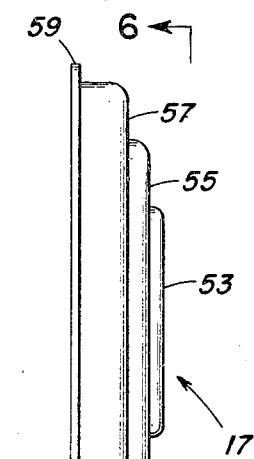
FIG. 4 is a front end view of the cap member, which view has been taken as indicated by the view plane 4—4 in FIG. 2.

In greater detail, FIGS. 1–9 illustrate a plastic carrier construction 11 for a plate 13 (see FIGS. 3 and 8) such as for example, a fragile, metal clad glass photographic plate or the like. The construction comprises a plate holder member 15, a cap member 17 and at least one hinge member 19 integral with the holder and cap members. All three members are formed, for example, by vacuum forming, from a flexible sheet of normally solid thermoplastic resin material. Hence, the walls of these members are of a substantially uniform thickness generally approximately that of the sheet. However, structural strength and desired rigidity of the plastic carrier 11 are obtained by the shapes of the holder and cap members.

The plate holder member 15 comprises a substantially flat base portion 21 (see FIGS. 2 and 6) surrounding a generally rectangular inwardly projecting or recessed generally flat central portion 23 (see FIGS. 8 and 9).

Marginally the base portion 21 merges (see FIG. 9) into a front side wall 25, a back side wall 27 and (see FIG. 8) lateral side walls 29 and 31. The corner portions 33 of the side walls are generally perpendicularly disposed relative to the base portion 21 and curvingly merge together at the corners of the holder member. The middle portion 34 (see FIGS. 8 and 9) of each of the side walls is inwardly recessed at the base portion 21 from the corner portions 33 of each side wall, and extends outwardly from the base portion 21 substantially to a first reference plane parallel to the base portion 21, at which plane the inside surfaces of the corner portions 33 and middle portion 34 are about even. The front and back side walls 25 and 27, and the front and back portions of the lateral side walls 29 and 31 extend a substantial distance beyond the first reference plane substantially to a second reference plane parallel to the first reference plane. The middle portion 35 of each lateral side wall 29 and 31, however, does not extend beyond the first reference plane. Consequently, each lateral side wall 29 and 31 has a middle recessed portion which permits a plate 13 to be deposited in and removed from the holder member 15 with edgewise handling. At the corners the front, back and lateral side walls are outwardly recessed beginning substantially at a third reference plane susbtantially spaced from, parallel to, and between the first and second reference planes, thereby providing corner ledges 37. The corner recesses extend substantially from the third reference plane to substantially the second reference plane. On each side of the corner recesses and commencing substantially at a fourth reference plane parallel to and between the third and second reference planes, each side wall has an inwardly projecting or overhang portion 39 which extends substantially from the fourth reference plane substantially to the second reference plane. The extent of inward projection of each overhang portion 39 is just sufficient to overlap a corresponding marginal part of the glass plate 13, when it is in position with its corner portions on the corner leadges 37, without covering a substantial area of the adjacent side of the plate. The fourth plane is spaced from the third plane by a distance such that when the glass plate 13 is in position it is clamped or snugly held by the ledge portions 37 and overhang portions 39. The opposite portions of the side walls between the recessed corners and between the third and fourth reference planes preferably are spaced from each other so that they bear against the ends of the glass plate 13 when it is in position in the holder member 15. Consequently, when a glass plate 13 is in position in the holder member, it is rendered immobile relative to the holder member; it cannot shift under normal conditions either longitudinally, laterally or transversely in the holder member.

Each of the side walls has an outwardly extending rim portion 41, the outer end of which curvingly merges into a skirt portion 43 which at its outer end curvingly merges into an outwardly extending flange portion 45. The rim portions 41, skirt portions 43 and flange portions 45 of the side walls curvingly merge together at the corners. The rim portions 41 of the lateral side walls 29 and 31 follow the already described general contour of the side walls. However, the flange portion 45 generally is substantially in a plane parallel to, but between, the first reference plane and the plane of the base portion 23.

Figure 3:
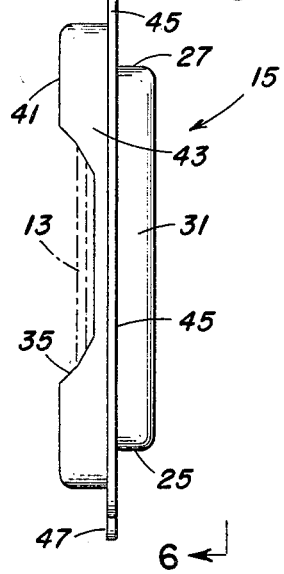
FIG. 3 is a side view of the open structure of FIG. 2.
Figure 5:
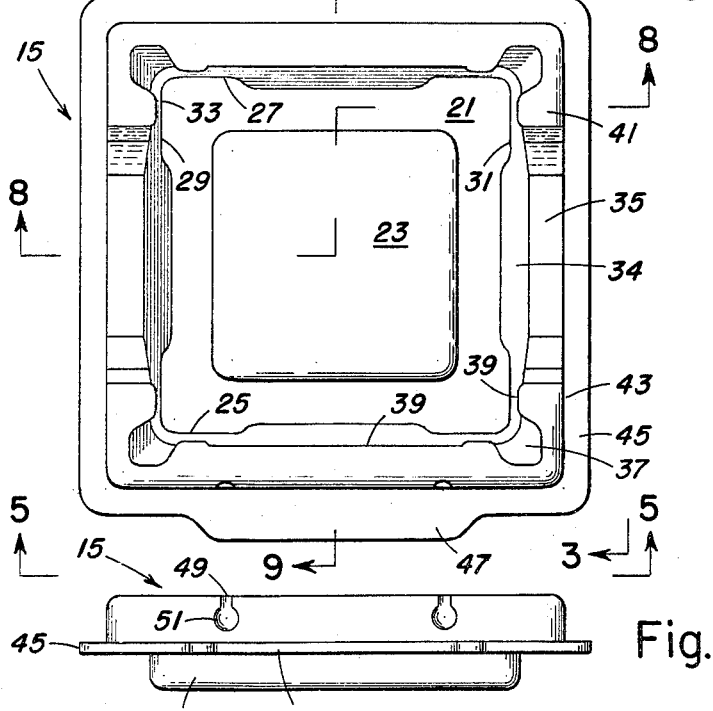
FIG. 5 is a front end view of the holder member of the structure of FIG. 2, which view has been taken as indicated by the view plane 5—5 in FIG. 2.

The center portion of the flange 45 on the front side wall 25 preferably has an outwardly extending finger grip or tab portion 47 (see FIGS. 2, 3 and 5). The tab portion 47 provides a convenient place to grasp the plate holder member 15 and hold it with the fingers on one hand while disengaging the cap member 17 from the holder member 15 and pivoting or tilting it back so as to open the carrier 11.

The skirt portion 43 of the front side wall 25 (see FIG. 5) has on the outside thereof a pair of grooves 49 extending downwardly from the corresponding rim portion 41 to corresponding sockets 51 formed in the skirt portion 43. The significance of the grooves 49 and sockets 51 is apparent in the following description of the cap member 17.

The cap member 17 is a rectangular cap-like end closure structure having front, back and lateral side walls that curvingly merge together at the corners. In addition, these walls curvingly merge at one end into a top wall comprising a center rectangular portion 53 projecting outwardly from a larger intermediate rectangular portion 55 which in turn projects outwardly from a still larger rectangular portion 57. Moreover, these walls curvingly merge at the other end into an outwardly extending peripheral flange 59. When the cap member 17 is in holder member capping position (see FIG. 1), the inside surfaces of the front, back and lateral side walls of the cap member 17 are adjacent the outside surfaces of the skirt portions 43 of the corresponding side walls of the holder member 15. Moreover, the peripheral flange 59 of the cap member is adjacent the peripheral flange formed by the flange portions 45 of the holder member, and preferably corresponds in shape longitudinally and laterally to the holder member peripheral flange, except for the tab portion 47 which should project outwardly beyond the front margin of the cap member flange 59.

The front side wall of the cap member 17 has a pair of inwardly extending projections or knobs (see FIG. 7) while the back side wall of the cap member 17 has a similar pair of projections or knobs 63 (see FIG. 2). When the cap member 17 is pivoted on the hinge members 19 into capping position on the holder member 15, the back knobs 63 engage the skirt portion 43 of the back side wall 27 of the holder member, and the front knobs 61, corresponding in position to the outwardly facing grooves 49 and sockets 51 in the skirt portion 43 of the front side wall 25, enter the grooves 49 and slide therein into the sockets 51 where they seat and latch in friction fit the cap member 17 to the holder member 15.

In the embodiment shown, there are two hinge members 19. Each of the hinge members is a strap-like piece integral with the flange portion 45 of the back side wall 27 of the holder member 15, and with the portion of the peripheral flange 59 on the back wall of the cap member 17.

As before indicated, the fragile plate carrier structure 11 is made from a single sheet of normally solid thermoplastic material. Such a material consists essentially of a resin selected from the group consisting of normally solid permanently thermoplastic resins and normally solid resins that at the time of making the carrier structure 11 are in a temporary thermoplastic stage. Examples of normally solid permanently thermoplastic resins include such synthetic resins as the normally solid poly-1-olefin resins (resins made by polymerizing one or more 1-olefins having 2-20 and commonly 2-6 carbon atoms to form homopolymers, heteropolymers including block copolymers, and the like), examples of which are polyethylene, polypropylene, poly(1-butene), polystyrene, polyallomer, and the like. Other normally solid permanently thermoplastic resins include polyvinyl chloride, polyvinyl acetate, and the like. Examples of normally solid synthetic resins having a temporary thermoplastic stage are the normally solid stage B polyester resins, normally solid acrylic resins, and the like.

The fragile plate carrier 11 is preferably made by vacuum forming a longitudinally and laterally flexible sheet of normally solid thermoplastic material. The vacuum forming procedure preferably followed is for the most part conventional. It comprises heating the sheet until it is soft or plastic, placing the sheet in a closed mold, applying vacuum sufficient to conform the plastic sheet to the mold, whereby the shaped article, in this instance the fragile plate carrier, in completely open condition as in FIGS. 2 and 6, is formed, and thereafter cooling the shaped article until it is at least hard enough to be handled under normal conditions. without permanent deformation. Preferably, while the hinge member or hinge members, if more than one, are still pliable, but preferably on the verge of becoming non-plastic or hard or set, the cap member 17 is pivoted out of its fully open position as shown in FIGS. 2 and 6 toward the plate holder member 15 (or toward its holder member capping position as shown in FIG. 1), and the thus bent hinge member or members permitted to cool and become hardened or set, whereby each hinge member 19 has a permanent fold line or crease 65 which tends under normal operative conditions to urge the open cap member 17 toward its holder member capping position.

In general the only synthetic resins which have sufficient flexural strength or resistance to fatigue failure to withstand almost seemingly infinite flexing and bending are the normally solid crystalline polypropylene and polyallomer resin materials. When a fragile plate carrier of this invention is made from a flexible sheet of one of these materials, after it has been formed, no further treatment is generally needed; the carrier is ready to use as is. However, in the case of other normally solid poly-1-olefin resins, for example, normally solid polyethylene and polystyrene resins, and in the case of normally solid polyvinyl chloride resins, the hinge members 19 might not have as much flexural strength as might be desired. Consequently, when these resins are employed, it is usually preferred that the fragile plate carrier 15 be processed as follows. After the fragile plate carrier has been vacuum formed, but while the hinge member or hinge members, if more than one, are still pliable or plastic, but preferably on the verge of hardening, and after bending over the hinge member or members, if this step is employed, each folded or bent hinge member 19 is longitudinally compressed as, for example, by pushing each hinge member 19 at the fold toward the cap member 17 and the plate holder member 15 at least sufficiently to form laterally oriented small wrinkles or striations 65 (see FIGS. 2 and 6). Thereafter, the cap member 17 is swung back and forth preferably a few times on the hinge member or members 19, and then each hinge member is permitted to cool to the non-plastic condition. The resulting hinge member 19 in each case has as a result of this procedure substantially increased flexural strength. As a matter of fact in one model of the plate carrier of this invention, which was made from conventional low density polyethylene resin material, the flexural strength of the resulting hinge members 19 was found in testing to be close to that of hinge members 19 or normally solid polypropylene and polyallomer resin materials. In other embodiments the compression step can be performed with the holder and cap members in fully open position by pushing the cap and holder members toward each other.

To use the fragile plate carrier 11 with the cap member 17 in an open position, the front and back side walls 25 and 27 of the plate holder member 15 are twistably flexed and held longitudinally outwardly and the lateral side walls 29 and 31 are twistably flexed laterally outwardly and held so as to turn upwardly the overhang portion 39 of each of these side walls, and a fragile plate 13 or the like is deposited with lateral edgewise handling onto the ledge 37 at the corners of the holder member. Thereafter, the outwardly flexed side walls are released so as to spring back into their normal positions. This brings the overhang portions 39 of each of the side walls into overlapping position relative to the corresponding marginal portions of the plate 13. This procedure can be performed by hand and in this connection, because of the holder member structure, particularly the central recess portion 23, transverse buckling of the holder member 15 normally does not take place. The operation can also be performed mechanically as by a jig with a pedestal on which the outwardly facing side of the central recess portion 23 is placed and supported, and means for engaging the side walls of the holder member 15 when it is in position on the pedestal, and for twistably flexing them outwardly sufficiently to turn the overhang portions 39 outwardly from the path of travel of the glass plate 13 when deposited manually or mechanically (with movable lateral edge engaging means) in the holder member 15. After the holder member 15 has been loaded with the plate 13, the cap member 17 is then pivoted on the hinge members 19 and pressed into holder member capping position with the inwardly extending protrusions or knobs 61 of the cap member 17 seated in the corresponding sockets 51 in the holder member front side wall 25. To remove the plate 13, the foregoing procedure is reversed.

Thus, there is provided a simple, economical, enclosed, fragile plate carrier of a one-piece hinged construction and with a hinge member of high flexural strength. With a plate in position in the holder member, and the cap member in holder member capping position, the plate carrier has substantial rigidity longitudinally, laterally and transversely, indeed in some embodiments more rigidity than when no plate is in the holder member. Because of the structures of the plate carrier member and cap member, both sides of a plate in position in the capped holder member are protected under normal conditions from contact with other surfaces including surfaces of the carrier. Moreover, a plate in position in the capped holder member has a high degree of protection from impact forces because of residual flexibility and resiliency in the carrier. At the same time the plate for which the carrier is intended, when in position therein, is snugly held thereby so that it is substantially immovable relative to the carrier.

Other features, advantages and specific embodiments of the covered container of this invention will be readily apparent to those in the exercise of ordinary skill in the art after reading the foregoing disclosure.

What is claimed is:
1. A carrier for a rectangular plate, which comprises: a rectangular holder member having front, back and lateral side walls with one end closed and the other end open, with a ledge at least at three of the corners and substantially in a first reference plane for supporting corresponding corner portions of said plate with each ledge facing said open end, and with at least two opposite ones of said walls having between said open end and said reference plane inwardly projecting portions which overlap marginal portions of said plate when in position on said ledges, and with at least two opposite ones of said walls being recessed from said open end to beyond said first reference plane, whereby said plate can be deposited in and removed from said holder member with edgewise handling;
an end closure member for closing said other end; and at least one hinge member integral with said holder member and said end closure member.

2. A carrier according to claim 1, wherein said members are vacuum formed from a flexible sheet of thermoplastic resin material and with the walls of said members having substantially the thickness of said sheet.

3. A carrier according to claim 2, wherein said holder member at said closed end has a generally rectangular base portion and a central inwardly recessed rectangular portion substantially spaced from said first reference plane.

4. A carrier according to claim 3, wherein said base portion curvingly merges into said side walls with the corner portions of said side walls being generally perpendicular to said base portion and the middle portions of said side walls being inwardly recessed.

5. A carrier according to claim 4, wherein said side walls have outwardly offset corner portions extending from said first reference plane to said open end, thereby providing said ledges.

6. A carrier according to claim 5, wherein said side walls at said open end have sidewise extending rim portions that curvingly merge at their outer ends into skirt portions which curvingly merge into sidewise extending and flange portions.

7. A carrier according to claim 6, wherein said end closure member comprises a rectangular cap having front, back and lateral side walls that are adjacent the skirt portions of said side walls of said holder member when said end closure member is in end closing position, and that are open at one end and closed at the other end with said walls at the open end curvingly merging into a sidewise extending peripheral flange, and said walls at said closed end curvingly merging into a top having a rectangular outwardly projecting portion surrounding a rectangular still further outwardly projecting portion.

8. A carrier according to claim 7, wherein said back wall of said end closure member has at least one inwardly extending projecting for bearing against the corresponding skirt portion of said back wall of said holder member, when the end closure member is in end closing position, and said front wall of said end closure member has at least one inwardly extending projection for bearing against the corresponding skirt portion of said front wall of said holder member, when the end closure member is in end closing position, and said corresponding skirt portion of said front wall of said holder member has at least one socket for receiving said projection of said front wall when the end closure member is in end closing position, whereby the end closure member is retained in said end closing position.

9. A carrier according to claim 8, wherein said hinge member is an interconnecting strap-like member having a laterally extending fold line therein.

10. A carrier according to claim 9, wherein said thermoplastic resin material is selected from the group consisting of normally solid polyethylene resin material, normally solid polystyrene resin material and normally solid polyvinyl chloride resin material, and said hinge member is in pre-stressed permanent compression in a direction transverse to the hinge line.

References Cited

UNITED STATES PATENTS

| | | | |
|---|---|---|---|
| 3,192,978 | 7/1965 | Horvath | 206—46 X |
| 3,256,975 | 6/1966 | Puente | 206—46 |

FOREIGN PATENTS 925,477  5/1963  Great Britain.

MARTHA L. RICE, Primary Examiner

U.S. Cl. X.R.

150—.5; 206—62; 220—31; 264—295